(12) United States Patent
Barani

(10) Patent No.: US 8,092,741 B2
(45) Date of Patent: Jan. 10, 2012

(54) WATER CHLORINATING DEVICE

(75) Inventor: Corrado Barani, Castelvetro di Modena (IT)

(73) Assignee: Marchi & Brevetti Interprise S.R.L., Modena (IT)

( * ) Notice: Subject to any disclaimer, the term of this patent is extended or adjusted under 35 U.S.C. 154(b) by 1313 days.

(21) Appl. No.: 10/503,623

(22) PCT Filed: Feb. 5, 2002

(86) PCT No.: PCT/IT02/00067
§ 371 (c)(1), (2), (4) Date: Feb. 11, 2005

(87) PCT Pub. No.: WO03/066534
PCT Pub. Date: Aug. 14, 2003

(65) Prior Publication Data
US 2005/0129596 A1 Jun. 16, 2005

(51) Int. Cl.
| B01D 11/02 | (2006.01) |
| A61L 2/00 | (2006.01) |
| C02F 1/76 | (2006.01) |
| C02F 1/68 | (2006.01) |
| G01F 11/10 | (2006.01) |
| B08B 3/00 | (2006.01) |
| B67D 5/08 | (2006.01) |

(52) U.S. Cl. .......... 422/37; 422/261; 422/274; 422/275; 422/292; 422/300; 422/311; 422/901; 422/902; 210/749; 210/754; 210/764; 210/765; 134/93; 134/103.1; 222/320; 222/56; 222/57; 222/66; 222/365

(58) Field of Classification Search .......... 422/261, 422/274–275, 292, 300, 311, 901, 902, 37; 210/749, 754, 764–765; 134/93, 103.1; 222/320, 222/56–57, 66, 365
See application file for complete search history.

(56) References Cited

U.S. PATENT DOCUMENTS

| 452,764 A * | 5/1891 | Salathe ............................ 208/22 |
| 2,378,134 A * | 6/1945 | Evans ............................ 422/106 |
| 3,638,833 A * | 2/1972 | Lucas ............................... 222/57 |
| 3,727,889 A * | 4/1973 | Nagel ............................. 366/349 |
| 3,804,253 A | 4/1974 | Wellman et al. |
| 4,009,104 A * | 2/1977 | Behrendt et al. .............. 210/744 |
| 4,040,515 A | 8/1977 | Hessel et al. |
| 4,260,587 A | 4/1981 | Braden ........................ 422/282 |
| 4,297,223 A | 10/1981 | Rivenbark ..................... 210/754 |
| 4,519,914 A | 5/1985 | Etani |
| 4,530,120 A | 7/1985 | Etani |

(Continued)

OTHER PUBLICATIONS

Elsy, David of Withers & Rogers LLP, Letter to Applicant's European representative regarding European Patent No. EP 1 472 189 B1, Feb. 8, 2011.

(Continued)

*Primary Examiner* — Jill Warden
*Assistant Examiner* — Monzer Chorbaji
(74) *Attorney, Agent, or Firm* — Berenato & White, LLC

(57) ABSTRACT

A water chlorinating device having a vessel (2) in turn having a bottom portion (6) for containing water; a grille (10) located over the bottom portion and for supporting a solid chemical chlorinating substance (11); a spray device (13) for directing at least one water jet on to the grille (10); and a mixing nozzle (29) located inside the bottom portion (6), at the bottom of the vessel (2), and for agitating the water in the bottom portion (6) by means of a water jet.

12 Claims, 1 Drawing Sheet

U.S. PATENT DOCUMENTS

| | | |
|---|---|---|
| 4,769,137 A | 9/1988 | Powell |
| 4,917,868 A | 4/1990 | Alexander et al. |
| 4,923,618 A | 5/1990 | Casberg et al. |
| 5,089,127 A | 2/1992 | Junker et al. .................. 210/206 |
| 5,928,608 A * | 7/1999 | Levesque et al. ............... 422/37 |
| 2002/0011436 A1 | 1/2002 | Blanchette et al. |

OTHER PUBLICATIONS

Arch Chemicals, Inc., Commercial Invoices May 9, 2001 and May 23, 2001.

Arch Chemicals, Inc., HTH Pulsar [4] System Operator's Manual, Model # PS 8000, Mar. 21, 2000, Rev 4, pp. 1-14.

* cited by examiner

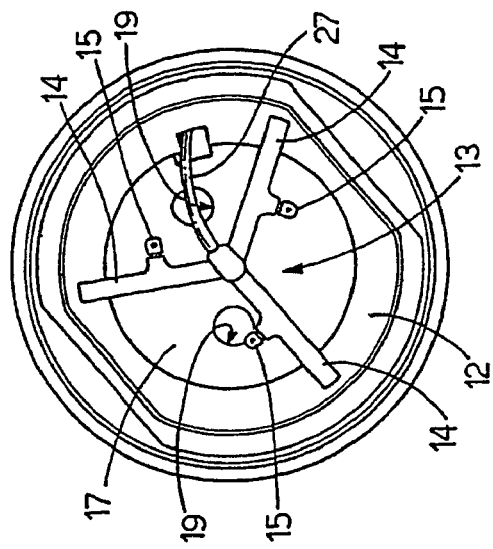
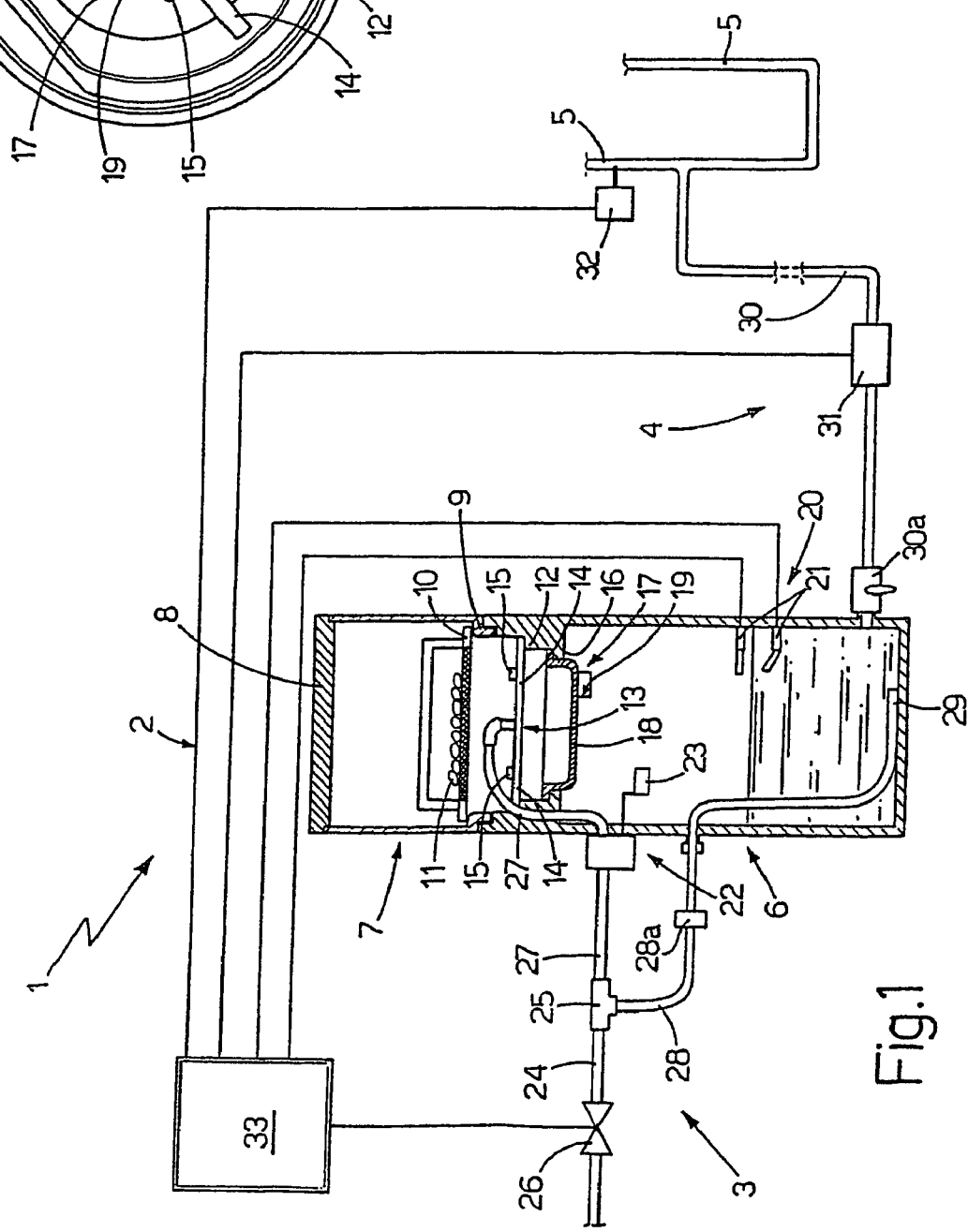

WATER CHLORINATING DEVICE

TECHNICAL FIELD

The present invention relates to a water chlorinating device.

The present invention may be used to advantage for treating swimming-pool water, and in particular for effectively dissolving solid chlorine derivatives (calcium hypochlorite, isocyanides, and mixtures or derivatives of these), to which the following description refers purely by way of example.

BACKGROUND ART

Of known pool chlorinating devices, one comprises a vessel with a hold portion for the chlorinated water; perforated (or porous) supporting means located over the hold portion and for supporting a solid chemical chlorinating substance; and water supply means for directing at least one jet of water on to the supporting means.

The chlorinated water so produced is left inside the vessel until it is fed into the pool, so that the dissolved solid chemical substances precipitate and form deposits inside the vessel. Since the solid chemical substances normally comprise calcium hypochlorite, the deposits mainly formed inside the vessel are calcium sulphate and calcium carbonate.

Known pool chlorinating devices therefore require regular manual removal of such deposits, after first shutting down the device and so interrupting the water treatment. While the chlorinating device is turned off to clean the vessel, pool hygiene is therefore impaired; and the need for relatively frequent manual cleaning of the vessel results in relatively high maintenance costs.

U.S. Pat. No. 5,928,608 discloses a chlorinating device comprising a vessel with a hold portion for the chlorinated water and a mechanical stirrer for stirring the water contained in the hold portion. It should be pointed out that the mechanical stirrer is relatively cumbersome, expensive and difficult to implement. Moreover, since it is likely that, in use, chemical substances precipitate on the mechanical stirrer, the device disclosed by U.S. Pat. No. 5,928,608 requires relatively frequent cleaning operations.

SUMMARY OF THE INVENTION

It is an object of the present invention to provide a water chlorinating device designed to eliminate the aforementioned drawbacks.

According to an embodiment of the present invention, there is provided a water chlorinating device including a vessel having a hold portion for chlorinated water, supporting means located over the hold portion for supporting a solid chemical chlorinating substance, water dispersion means for directing at least a first water jet on to the supporting means, and mixing means, which are located at the hold portion and designed for agitating the chlorinated water in the hold portion. The mixing means includes spray means located at the hold portion and designed for emitting at least a second water jet so as to stir the chlorinated water in the hold portion.

In a preferred embodiment, the mixing means comprise spraying means for emitting at least a second jet of water.

BRIEF DESCRIPTION OF THE DRAWINGS

A non-limiting embodiment of the present invention will be described by way of example with reference to the accompanying drawings, in which:

FIG. 1 shows a schematic front section of a water chlorinating device in accordance with an embodiment of the present invention and connected to a swimming-pool recirculating line;

FIG. 2 shows a larger-scale plan view of a detail of the FIG. 1 device.

DETAILED DESCRIPTION OF EMBODIMENTS OF THE INVENTION

Number 1 in FIG. 1 indicates as a whole a swimming-pool water chlorinating device comprising a substantially cylindrical vessel 2 in which the water is chlorinated; a supply unit 3 for feeding water from a known water system (not shown) into vessel 2; and a discharge unit 4 for feeding chlorinated water from vessel 2 into a swimming-pool, a portion of a recirculating circuit 5 of which is shown in FIG. 1.

Vessel 2 is positioned vertically, and is defined at the bottom by a chlorinated water hold portion 6, which is located beneath a containment portion 7 hinged to and defined at the top by a cover 8. Portions 6 and 7 can be separated for relatively easy maintenance inside portion 6.

Vessel 2 has an annular supporting member 9 located at the bottom end of portion 7 and on which rests a removable grille 10 for supporting a solid chemical chlorinating substance 11, preferably in the form of pellets and containing calcium hypochlorite, isocyanides, and mixtures or derivatives of these.

Vessel 2 also comprises an annular supporting member 12 located at the top end of hold portion 6 and supporting a water dispersion unit 13 underneath grille 10. Dispersion unit 13 is removable, provides for dissolving solid chemical substance 11 by directing three vertical water jets on to grille 10, and comprises three linear, horizontal conduits 14 connected spoke-fashion at the centre. Each conduit 14 has a closed outer end, and is fitted with a spray nozzle 15 for directing a water jet on to grille 10.

Vessel 2 also comprises an annular supporting member 16 for supporting a substantially cylindrical member 17 coaxial with vessel 2 and located beneath dispersion unit 13. Cylindrical member 17 is open at the top, and is defined at the bottom by a circular, substantially horizontal wall 18 with two holes 19, through which the chlorinated water flows in use.

Device 1 also comprises a level detecting unit 20 for detecting the chlorinated water level inside hold portion 6, and which comprises two substantially identical known floats 21 (shown schematically) spaced apart, one over the other, inside hold portion 6 and beneath cylindrical member 17. Each float 21 is movable between a respective lowered position and a respective raised position, and has a known sensor (not shown) for detecting its position. In actual use, each float 21 is in the raised position when reached or exceeded by the chlorinated water level.

Device 1 also comprises a safety unit 22 (known and shown schematically) for cutting off water supply to dispersion unit 13 when, in use, the chlorinated water level in portion 6 exceeds both floats 21 and reaches a given safety level. Safety unit 22 comprises a float 23 located inside hold portion 6, above floats 21 and beneath cylindrical member 17, and the position of which defines the safety level.

Supply unit 3 comprises a pipe 24 for feeding water from the known water mains (not shown) to a T fitting 25; and a solenoid valve 26 installed, and for regulating water flow, along pipe 24.

Supply unit 3 also comprises a conduit 27 for feeding water from fitting 25 through known safety unit 22 (shown schematically) to water dispersion unit 13; and a conduit 28 for feeding water directly from fitting 25 to hold portion 6. Conduit 28 has a first end connected to fitting 25; and a second end 29 resting on the bottom of vessel 2, so that, in use, the water jet from second end 29 mixes the chlorinated water inside portion 6.

Supply unit 3 also comprises a hand-operated tap 28a installed, and for regulating water flow, along conduit 28.

Discharge unit 4 comprises a pipe 30 connecting hold portion 6 to recirculating circuit 5; and a pump 31 located along pipe 30 and for feeding the water from vessel 2 along pipe 30 to recirculating circuit 5. Pipe 30 is connected to vessel 2 by a ball valve 30a.

Device 1 also comprises a concentration sensor 32 for determining the chlorine concentration of the chlorinated water in recirculating circuit 5 upstream from pipe 30.

Finally, device 1 also comprises a control unit 33 connected electrically to solenoid valve 26, to pump 31, to the known sensors (not shown) of floats 21, and to sensor 32.

Control unit 33 activates pump 31 on the basis of the findings of sensor 32 to keep the chlorine concentration of the pool water, i.e. of the water in recirculating circuit 5, between a minimum and a maximum concentration. More specifically, in actual use, unit 33 activates pump 31 when the chlorine concentration detected by the sensor is relatively close to the minimum concentration, and stops pump 31 when the chlorine concentration detected by sensor 32 is relatively close to the maximum concentration.

Control unit 33 also controls solenoid valve 26 to keep the chlorinated water in hold portion 6 between a minimum and maximum level, More specifically, in actual use, unit 33 opens solenoid valve 26 when both floats 21 are in the lowered position, and closes solenoid valve 26 when both floats are in the raised position.

In actual use, the water jet from end 29 of conduit 28 agitates the chlorinated water in hold portion 6, so that salt precipitation—mainly calcium carbonate and calcium sulphate (if calcium hypochlorite or similar is used)—and hence the formation of deposits inside portion 6 are fairly unlikely. In an embodiment not shown, conduit 28 is replaced with a known mechanical agitator (e.g. a rotary blade) to keep the chlorinated water in hold portion 6 in motion.

In a further embodiment not shown, conduit 28 is replaced with a recirculating unit for drawing and feeding back chlorinated water from and to portion 6, and which comprises a U-shaped conduit, along which water is fed by a pump. In actual use, the water jet from one end of the conduit agitates the chlorinated water in hold portion 6.

In a further embodiment not shown, safety unit 22 is connected electrically (in known manner) to control unit 33, so that control unit 33 closes solenoid valve 26 when the chlorinated water in portion 6 reaches the safety level.

The invention claimed is:

1. A method of chlorinating water comprising:
   positioning a solid chemical chlorinating substance on supporting means of a water chlorinating device, the water chlorinating device comprising a vessel having a hold portion for chlorinated water, the supporting means located on the hold portion, water dispersion means located over the hold portion, and mixing means comprising spraying means located at the hold portion;
   directing a first jet of water, which is emitted by the water dispersion means, on to the supporting means and the solid chemical chlorinating substance;
   emitting a second jet of water from the spraying means to agitate the chlorinated water in the hold portion;
   drawing the chlorinated water from the vessel; and
   maintaining the level of the chlorinated water in the hold portion substantially between a maximum level and a minimum level, which is lower than the maximum level.

2. A method as claimed in claim 1, wherein the water dispersion means are located beneath the supporting means.

3. A method as claimed in claim 1, wherein the supporting means comprise a grille.

4. A method as claimed in claim 1, further comprising controlling a supply of liquid water into the vessel so that the supply of liquid water into the vessel is started when the level of chlorinated water in the vessel is detected below the minimum level and is interrupted when the level of chlorinated water in the vessel is detected above the maximum level.

5. A method as claimed in claim 4, wherein:
   the water chlorinating device further comprises at least two floats, which are located inside the vessel and spaced apart one over the other inside the hold portion, are moveable between respective lowered and raised positions, and have respective sensors for detecting their respective positions;
   the method further comprises starting the supply of liquid water when the floats are both in their lowered position and interrupting the supply of liquid water when both floats are in their raised position.

6. A method as claimed in claim 1, further comprising:
   feeding the chlorinated water by discharge means from the vessel to an external container;
   detecting the chlorine concentration of the chlorinated water in the external container; and
   providing a control unit connected to the concentration detecting means to activate the discharge means to keep the chlorine concentration of the chlorinated water in the container between a maximum concentration and a minimum concentration.

7. A method as claimed in claim 6, wherein:
   the water chlorinating device further comprises a safety unit for detecting a safety level of the chlorinated water in the hold portion, the safety level being above the maximum level; and
   the safety unit is operatively connected to the control unit for interrupting the feeding of water into the vessel when the safety unit detects the safety level.

8. A method as claimed in claim 1, further comprising agitating the chlorinated water in the hold portion with a mechanical agitator.

9. A method as claimed in claim 1, further comprising drawing the chlorinated water from the vessel and feeding the drawn chlorinated water back into the vessel in the hold portion.

10. A method of chlorinating water comprising:
    positioning a solid chemical chlorinating substance on supporting means of a water chlorinating device, the water chlorinating device comprising a vessel having a hold portion for chlorinated water, the supporting means located on the hold portion, water dispersion means located over the hold portion, and mixing means comprising spraying means located at the hold portion;
    emitting a first jet of water from the water dispersion means and directing the first jet of water on to the supporting means and the solid chemical chlorinating substance;

emitting a second jet of water from the spraying means and agitating the chlorinated water in the hold portion with the second jet of water;

drawing the chlorinated water from the vessel;

detecting the level of the chlorinated water in the hold portion and maintaining the level substantially between a maximum level and a minimum level, which is lower than the maximum level;

controlling a supply of liquid water into the vessel so that the supply of liquid water into the vessel is started when the level of chlorinated water in the vessel is detected below the minimum level and is interrupted when the level of chlorinated water in the vessel is detected above the maximum level.

11. A method as claimed in claim 10, wherein:

the water chlorinating device further comprises at least two floats, which are located inside the vessel and spaced apart one over the other inside the hold portion, are moveable between respective lowered and raised positions, and have respective sensors for detecting their respective positions;

the method further comprises starting the supply of liquid water when the floats are both in their lowered position and interrupting the supply of liquid water when both floats are in their raised position.

12. A method of chlorinating water comprising:

positioning a solid chemical chlorinating substance on supporting means of a water chlorinating device, the water chlorinating device comprising a vessel having a hold portion for chlorinated water, the supporting means located on the hold portion, water dispersion means located over the hold portion, and mixing means comprising spraying means located at the hold portion;

emitting a first jet of water from the water dispersion means and directing the first jet of water on to the supporting means and the solid chemical chlorinating substance;

emitting a second jet of water from the spraying means and agitating the chlorinated water in the hold portion with the second jet of water;

feeding the chlorinated water by discharge means from the vessel to an external container;

detecting the level of the chlorinated water in the hold portion and maintaining the level of the chlorinated water substantially between a maximum level and a minimum level, which is lower than the maximum level;

detecting the chlorine concentration of the chlorinated water in the container with a concentration detecting means; and providing a control unit, connected to the concentration detecting means, to activate the discharge means to keep the chlorine concentration of the chlorinated water in the container between a maximum concentration and a minimum concentration.

* * * * *